United States Patent
Wenzel et al.

(10) Patent No.: US 9,566,763 B2
(45) Date of Patent: Feb. 14, 2017

(54) METHOD AND APPARATUS FOR BLIND STITCHING A FORMED COMPONENT AND COMPONENTS FORMED FROM THE METHOD

(71) Applicants: Edward J. Wenzel, Troy, MI (US); Ramez M. Habhab, Rochester Hills, MI (US)

(72) Inventors: Edward J. Wenzel, Troy, MI (US); Ramez M. Habhab, Rochester Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 14/834,254

(22) Filed: Aug. 24, 2015

(65) Prior Publication Data
US 2016/0052465 A1     Feb. 25, 2016

Related U.S. Application Data

(60) Provisional application No. 62/040,979, filed on Aug. 22, 2014.

(51) Int. Cl.
*B62D 39/00* (2006.01)
*B32B 7/08* (2006.01)
(Continued)

(52) U.S. Cl.
CPC . *B32B 7/08* (2013.01); *B32B 3/28* (2013.01); *B32B 5/02* (2013.01); *B32B 5/20* (2013.01);
(Continued)

(58) Field of Classification Search
CPC ............... B32B 7/08; B32B 3/28; B32B 5/02; B32B 5/20; B32B 5/22; B32B 5/245; B32B 9/025; B32B 9/046; B32B 9/047;B32B 27/065; B32B 27/12; B32B 27/30; B32B 27/32; B32B 266/025; B32B 307/546; B32B 307/734; B32B 605/003
See application file for complete search history.

(56) References Cited

U.S. PATENT DOCUMENTS 3,468,275 A     9/1969 Fake

FOREIGN PATENT DOCUMENTS

DE     102011118813 B3     1/2013
EP         0245214 A       11/1987
(Continued)

OTHER PUBLICATIONS

International Search Report for Application No. PCT/US2015/046597; Date of Mailing Dec. 10, 2015.
(Continued)

*Primary Examiner* — Lori L Lyjak
(74) *Attorney, Agent, or Firm* — Cantor Colburn LLP

(57) ABSTRACT

A method of applying stitching to an outer skin layer of an interior component is provided herein. The method including the steps of: a) penetrating the outer skin layer at an entry point on a first surface of the outer skin layer with a curved needle; b) exiting the outer skin layer at an exit point on the first surface with the curved needle, wherein the steps of penetrating and exiting cause a first thread to pass through the entry point and the exit point on the outer skin layer; c) grabbing the first thread with a hook located proximate to the exit point; d) retracting the needle through the exit point and the entry point while pulling a second thread through the exit point via the first thread to form a stitch; e) advancing the outer skin layer to a new location with respect to the needle and hook; and f) repeating steps a-e until a predetermined amount of stitches are applied to the outer skin layer.

26 Claims, 10 Drawing Sheets

(51) Int. Cl.
 B32B 5/02 (2006.01)
 B32B 5/20 (2006.01)
 B32B 5/22 (2006.01)
 B32B 5/24 (2006.01)
 B32B 9/02 (2006.01)
 B32B 9/04 (2006.01)
 B32B 27/06 (2006.01)
 B32B 27/12 (2006.01)
 B32B 27/30 (2006.01)
 B32B 27/32 (2006.01)
 B32B 3/28 (2006.01)

(52) U.S. Cl.
 CPC ............... *B32B 5/22* (2013.01); *B32B 5/245* (2013.01); *B32B 9/025* (2013.01); *B32B 9/046* (2013.01); *B32B 9/047* (2013.01); *B32B 27/065* (2013.01); *B32B 27/12* (2013.01); *B32B 27/30* (2013.01); *B32B 27/32* (2013.01); *B32B 2266/025* (2013.01); *B32B 2266/0278* (2013.01); *B32B 2307/546* (2013.01); *B32B 2307/734* (2013.01); *B32B 2605/003* (2013.01)

(56) References Cited

FOREIGN PATENT DOCUMENTS

GB 262762 A 5/1927
RU 2467671 C1 11/2012

OTHER PUBLICATIONS

Written Opinion for Application No. PCT/US2015/046597; Date of Mailing Dec. 10, 2015.
English Translation to DE102011118813 Abstract.
English Translation to RU2467671 Abstract.
English Translation to GB262762 Abstract.

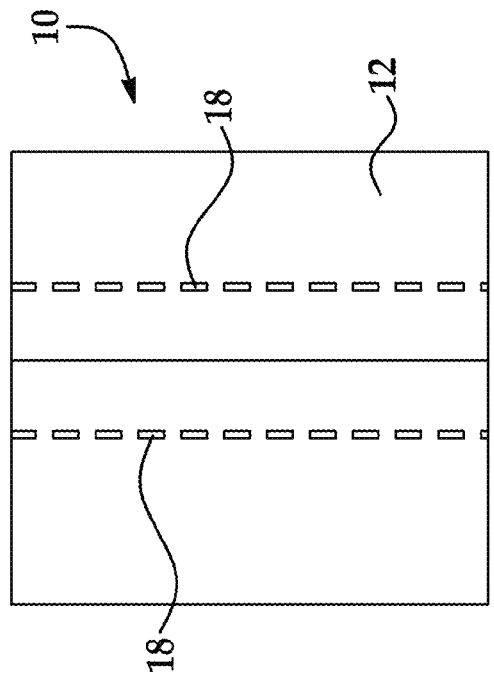
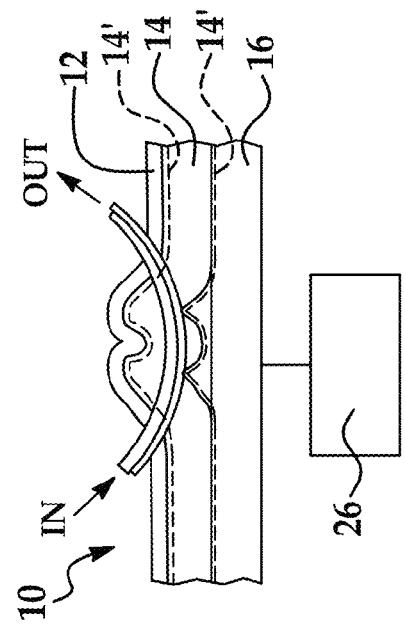
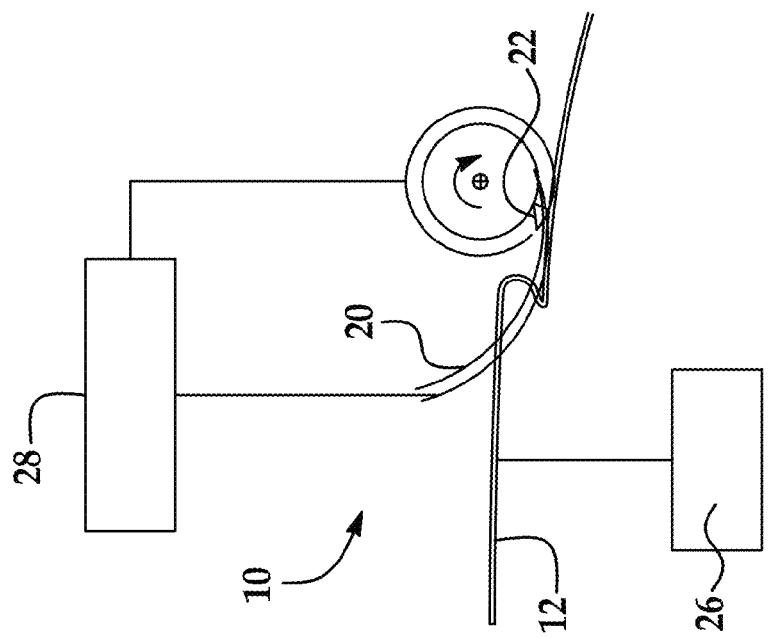
FIG. 6
FIG. 7
FIG. 5

METHOD AND APPARATUS FOR BLIND STITCHING A FORMED COMPONENT AND COMPONENTS FORMED FROM THE METHOD

CROSS REFERENCE TO RELATED APPLICATIONS

This application claims the benefit of U.S. Provisional Patent Application Ser. No. 62/040,979, filed on Aug. 22, 2014, the entire contents of which are incorporated herein by reference thereto.

BACKGROUND

This invention relates to an interior structure for a vehicle interior. More particularly, the invention relates to an apparatus and method for stitching vehicle interior components. Still further, various embodiments of the present invention relate to placing a decorative stitch on a trim piece regardless of whether it is used in a vehicle or not.

Currently, most stitching found in an automotive interior is of the functional variety, wherein two or more pieces of material (leather, vinyl, TPO, cloth, etc) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications; however, the ability to offer a simulated stitch in a contrasting color is not production feasible at this time. Additionally, more OEMs are requesting that a real or "live" stitch be used on decorate components to provide the look and feel of a true cut-n-sew component.

Current means of placing a decorative stitch on a 3D preformed automotive trim component consist of penetrating the part (skin, skin/foam, or skin/foam/substrate) with a needle from the top side of the part and engaging a hook or looper located on the backside of the part. These methods required access to both the front and backside of the part, which often limits the location of stitch placement on the parts. Placement of stitching on brows, sharp corners, and highly contoured surfaces as often seen with true cut and sew wrapped automotive interior trim is often very difficult.

Accordingly, it is desirable to provide a method and apparatus for producing a live, non-functional stitch on decorative automotive trim components. It is also desirable to provide a component with such a stitch.

SUMMARY OF THE INVENTION

A method of applying stitching to an outer skin layer of an interior component is provided herein. The method including the steps of: a) penetrating the outer skin layer at an entry point on a first surface of the outer skin layer with a curved needle; b) exiting the outer skin layer at an exit point on the first surface with the curved needle, wherein the steps of penetrating and exiting cause a first thread to pass through the entry point and the exit point on the outer skin layer; c) grabbing the first thread with a hook located proximate to the exit point; d) retracting the needle through the exit point and the entry point while pulling a second thread through the exit point via the first thread to form a stitch; e advancing the outer skin layer to a new location with respect to the needle and hook; and f) repeating steps a-e until a predetermined amount of stitches are applied to the outer skin layer.

Also provided herein is an interior component of a vehicle formed by the above method.

In addition to one or more of the features described above, or as an alternative to any of the foregoing embodiments, the outer skin layer may be formed from the group consisting of vinyl, leather and thermoplastic polyolefin.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the outer skin layer, may be formed from the group consisting of vinyl, leather and thermoplastic polyolefin; and wherein an intermediary layer is applied to a second surface of the outer skin layer, the second surface being opposite the first surface.

In addition to one or more of the features described above, or as an alternative to any of the foregoing embodiments, the intermediary layer may be a foam layer.

In addition to one or more of the features described above, or as an alternative to any of the foregoing embodiments, the substrate layer may be applied to the foam layer and the substrate layer may be formed from plastic.

In addition to one or more of the features described above, or as an alternative to any of the foregoing embodiments, the interior component may be an interior trim piece of a vehicle.

In addition to one or more of the features described above, or as an alternative to any of the foregoing embodiments, further embodiments may include an interior component formed by the method of claim 1.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the outer skin layer may be formed from the group consisting of vinyl, leather and thermoplastic polyolefin; and wherein an intermediary layer may be applied to a second surface of the outer skin layer, the second surface being opposite the first surface.

In addition to one or more of the features described above, or as an alternative to any of the foregoing embodiments, the intermediary layer may be a foam layer and wherein a substrate layer may be applied to the foam layer and wherein the substrate layer may be formed from plastic.

In another embodiment, a method of applying stitching to an interior component, having an outer skin layer, a substrate layer and an intermediary layer located between the outer skin layer and the substrate layer is provided. The method including the steps of: a) penetrating the outer skin layer at an entry point on a first surface of the outer skin layer with a curved needle; b) exiting the outer skin layer at an exit point on the first surface with the curved needle, wherein the steps of penetrating and exiting cause a first thread to pass through the entry point and the exit point on the outer skin layer; c) grabbing the first thread with a hook located proximate to the exit point; d) retracting the needle through the exit point and the entry point while pulling a second thread through the exit point via the first thread to form a stitch; e) advancing the outer skin layer to a new location with respect to the needle and hook; and f) repeating steps a-e until a predetermined amount of stitches are applied to the outer skin layer.

In addition to one or more of the features described above, or as an alternative to any of the foregoing embodiments, the outer skin layer may be formed from the group consisting of vinyl, leather and thermoplastic polyolefin; and the intermediary layer is a foam layer and the substrate layer is formed from plastic and wherein during the penetrating step the needle also passes through the intermediary layer.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In yet another embodiment, a method of applying stitching to an interior component having an outer skin layer and a foam layer applied thereto is provided. The method including the steps of: a) penetrating the outer skin layer at an entry point on a first surface of the outer skin layer with a curved needle; b) exiting the outer skin layer at an exit point on the first surface with the curved needle, wherein the steps of penetrating and exiting cause a first thread to pass through the entry point and the exit point on the outer skin layer and wherein the foam layer is applied to a second surface of the outer skin layer, the second surface being opposite the first surface and wherein the needle also passes through a portion of the foam layer as it travels through the entry point and the exit point; c) grabbing the first thread with a hook located proximate to the exit point; d) retracting the needle through the exit point and the entry point while pulling a second thread through the exit point via the first thread to form a stitch; e) advancing the outer skin layer to a new location with respect to the needle and hook; and f) repeating steps a-e until a predetermined amount of stitches are applied to the outer skin layer.

In addition to one or more of the features described above, or as an alternative to any of the foregoing embodiments, the intermediary layer may be a spacer fabric.

In addition to one or more of the features described above, or as an alternative to any of the foregoing embodiments, the outer skin layer may be formed from the group consisting of vinyl, leather and thermoplastic polyolefin.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the interior component may be an interior trim piece of a vehicle.

In addition to one or more of the features described above, or as an alternative to any of the foregoing embodiments, the outer skin layer may be formed from the group consisting of vinyl, leather and thermoplastic polyolefin; and the intermediary layer may be applied to a second surface of the outer skin layer, the second surface being opposite the first surface and wherein the intermediary layer is a foam layer and a substrate layer is applied to the foam layer, wherein the substrate layer is formed from plastic and wherein the curved need passes through the outer layer, the foam layer and the substrate layer when the stitch is formed.

In yet another embodiment, a method of applying stitching to an outer skin layer of a component is provided herein. The method including the steps of: a) penetrating the outer skin layer at an entry point on a first surface of the outer skin layer with a curved needle; b) exiting the outer skin layer at an exit point on the first surface with the curved needle, wherein the steps of penetrating and exiting cause a first thread to pass through the entry point and the exit point on the outer skin layer; c) grabbing the first thread with a hook located proximate to the exit point; d) retracting the needle through the exit point and the entry point while pulling a second thread through the exit point via the first thread to form a stitch e advancing the outer skin layer to a new location with respect to the needle and hook; and f) repeating steps a-e until a predetermined amount of stitches are applied to the outer skin layer.

BRIEF DESCRIPTION OF THE DRAWINGS

Other features, advantages and details appear, by way of example only, in the following description of embodiments, the description referring to the drawings in which:

FIG. 5 is a cross-sectional of a double stitch being formed in a deck seam in accordance with an exemplary embodiment of the present invention;

FIG. 6 is a view of a double stitch (French seam) formed in accordance with an exemplary embodiment of the present invention;

FIG. 7 is a cross-sectional view of a double stitch (French seam) formed in accordance with an exemplary embodiment of the present invention;

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Figure 2:
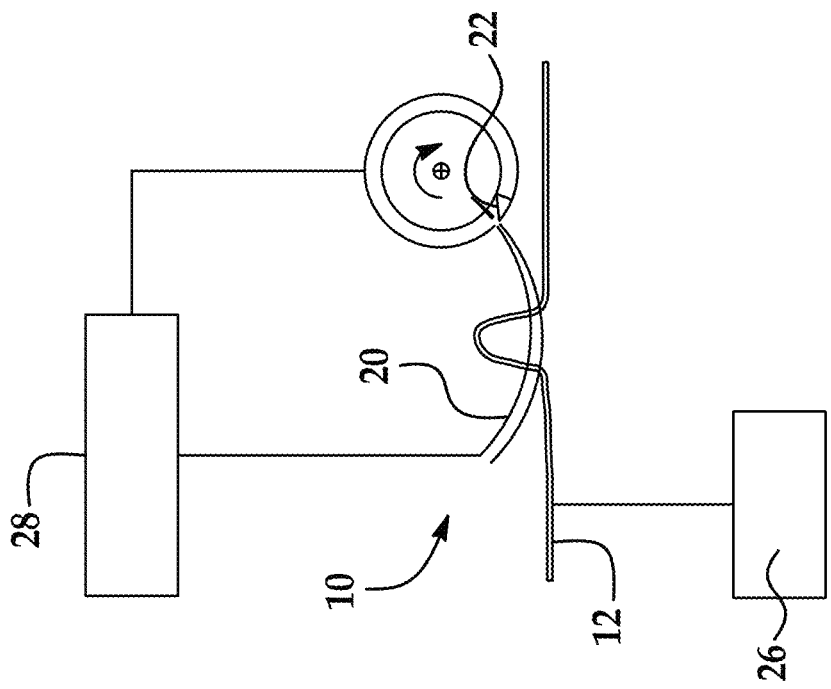
FIG. 2 is a cross-sectional of a simulated welt double stitch being formed in accordance with an exemplary embodiment of the present invention.
Figure 1:
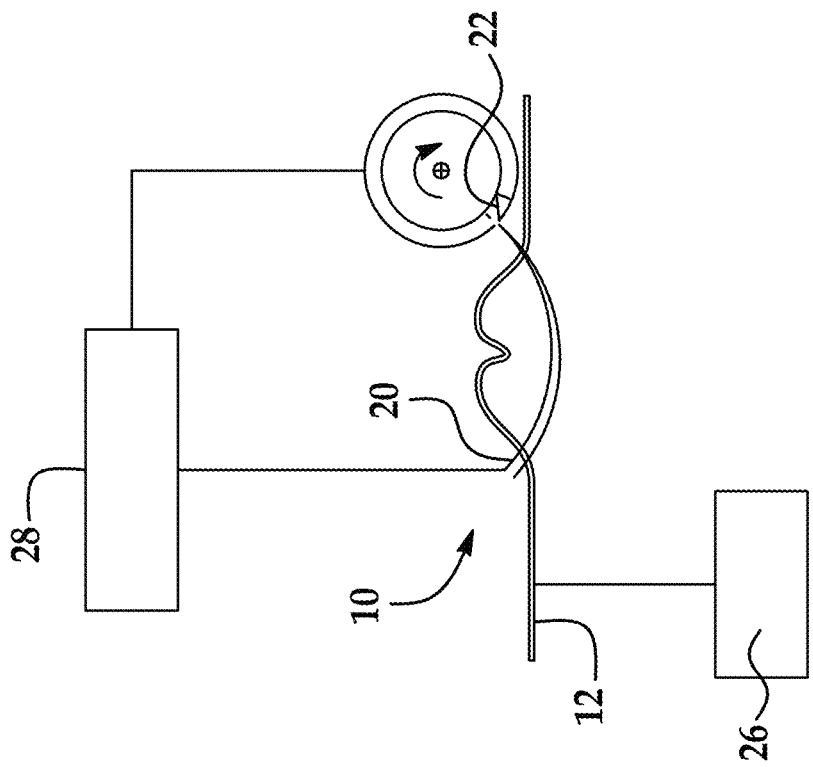
FIG. 1 is a cross-sectional of a standard double stitch being formed in accordance with an exemplary embodiment of the present invention.
Figure 4:
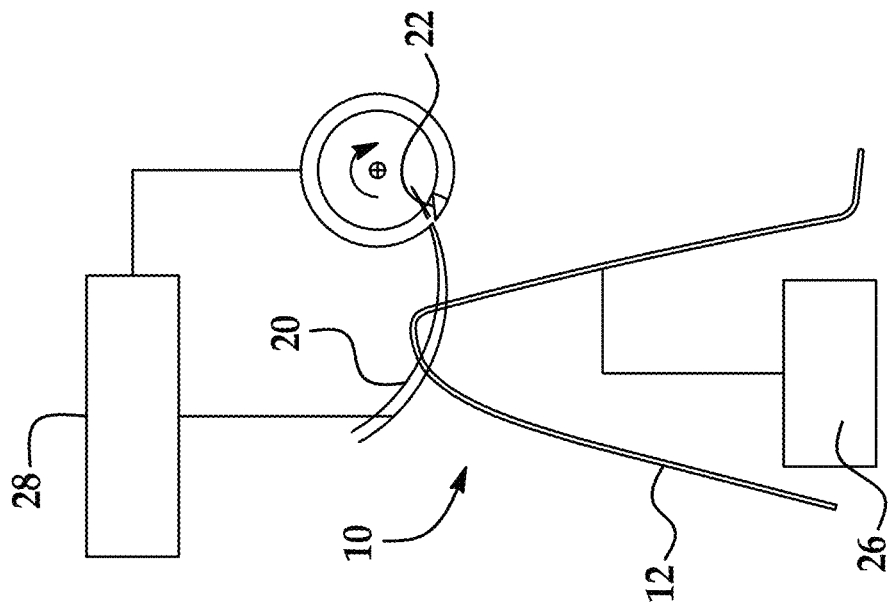
FIG. 4 is a cross-sectional of a double stitch being formed in brow tip in accordance with an exemplary embodiment of the present invention.
Figure 3:
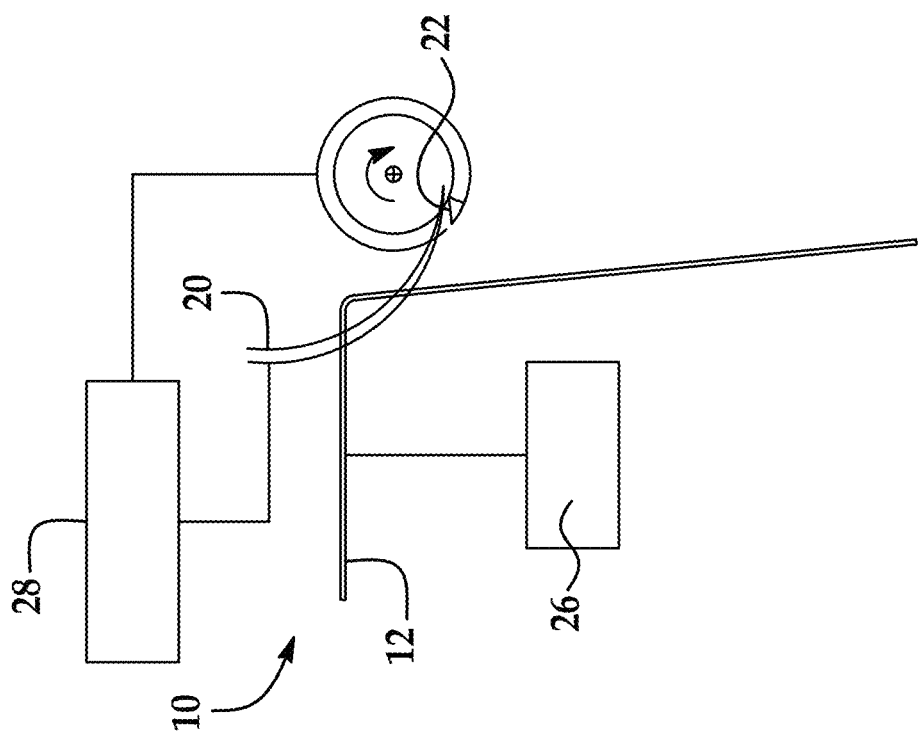
FIG. 3 is a cross-sectional of a double stitch being formed in a corner in accordance with an exemplary embodiment of the present invention.

Turning now to the drawings, wherein to the extent possible like reference numerals are utilized to designate like components throughout the various views, in FIG. 1 it is seen that an interior portion 10 of a vehicle is illustrated. In one implementation the interior portion 10 may be any portion of an interior of the vehicle. For example, portion 10 may comprise a portion of an instrument panel of a vehicle. Of course, the portion 10 may be located on any surface within the vehicle. Still further, the methodology disclosed herein may be applied to items or components used in other non-vehicular manufacturing processes and thus portion 10 may refer to any article of manufacture.

The portion, interior portion, component, item or part 10 may be a single layer or multi-layered construction. In one embodiment, the interior portion, portion or component 10 includes at least an outer skin layer 12 having a substantially smooth outer surface and an underside facing away from the outer surface. The outer skin layer 12 is preferably formed of a plastic material of substantial flexibility and aesthetically pleasing character. Of course, other materials natural (e.g., leather, etc.) and simulated coverings are contemplated to be used in various embodiments of the present invention. In one embodiment, the interior portion is a decorative element of a vehicle interior.

In order to enhance the softness of interior portion and in one embodiment, a layer of cushioning support material 14 may be provided in the region below the outer skin layer 12. It is contemplated that the cushioning support material may be of any number of different constructions although a foamed material such as cross linked polypropylene (XLPP) or polyurethane (PU) foam may be potentially preferred. A substrate panel 16 of dimensionally stable plastic or other suitable material may also be disposed below the cushioning support material.

According to one embodiment, the cushioning support material and the substrate panel may serve cooperatively to provide a support structure for the outer skin layer 12.

It is contemplated that PU foam forming the cushioning support material may be blown between the outer skin layer and the substrate panel so as to form a multi-layered composite structure. It is also contemplated that the cushioning material may be attached to the outer skin layer in a preliminary cladding operation so as to form a preliminary layered composite which may thereafter be applied across any substrate panel as may be utilized. It is also contemplated that the cushioning material may be attached to the outer substrate layer in a preliminary cladding operation so as to form a preliminary layered composite which may thereafter be wrapped with an outer skin layer.

Still further, the interior piece or decorative element 10 may be anyone of a single layer (skin 12 only), a double layer (skin 12/foam 14) or a triple layer (skin 12/foam 14/substrate 16). In yet another alternative embodiment, the intermediary foam layer 14 between the skin 12 and substrate 16 may be a spacer fabric 14' instead of a foam layer. In yet another alternative embodiment, the spacer fabric 14' may be used in conjunction with the foam layer 14 either between skin 12 and foam layer 14 or between substrate 16 and foam layer 14 or between both the skin 12 and foam layer 14 and foam layer 14 and substrate 16. See for example, the dashed lines in FIG. 7. Accordingly, the methods and related apparatus disclosed herein are contemplated as being used with anyone of the aforementioned interior piece 10 configurations.

As discussed above, there is a desire to provide a live, non-functional stitch 18 on decorative automotive trim components without using costly cut-n-sew technologies. In accordance with one embodiment of the present invention, the method is used to apply a double stitch 18 wherein stitches are located adjacent (e.g., opposite and parallel to each other).

Various embodiments of the present invention are directed to an alternative method of applying decorative stitching to unformed and preformed material constructions used in the transportation industry or vehicle and vehicle part manufacture. The methods disclosed herein can be used for both flatstock material (cut-n-sew) but provides greater benefit when used on a part that has some degree of rigidity such that it cannot be easily flattened without causing damage to the material. The stitch is applied to the component from one side (the decorative side) of the part only, such that no access to the backside of the part is required. The stitch is formed using a curved needle 20 which passes into the decorative side of the part at an entry point and then protrudes from the same decorative side at an exit point opposite to the location of the corresponding entry point but on the same decorative side of the part. At this point a hook 22 of a rotating or rotatable bobbin assembly 30 engages the needle thread 24 or a loop of the needle thread 24 just after the start of the needle 20 retraction back through the same point of protrusion or exit point. During needle retraction and upon release from hook 22, the needle thread 24 or loop of needle thread 24 engages or is wrapped around a bobbin thread 42 and pulls the bobbin thread 42 from the bobbin assembly 30 through the exit point of the needle to form a stitch.

As discussed further below, the engagement of the needle thread 24 and the bobbin thread results in the formation of a knot 44, which is located between the entry point and the exit point and is below the surface of outer skin layer 12.

Once the needle 20 retracts completely through the point of entry the article 10 is then advanced/moved to repeat the process. In other words, the part 10 is then moved slightly and the needle 20 passes into the decorative side of the part at another entry point adjacent to the last entry point and then protrudes from the same decorative side at another exit point adjacent to the last exit point and opposite to the location of the corresponding entry point but on the same decorative side of the part. Again, the hook 22 engages the needle thread 24 just after the start of the needle 20 retraction back through the same point of protrusion or exit point. During needle retraction, the needle thread 24 engages and pulls the bobbin thread 42 through the exit point of the needle to form a stitch. Once the needle 20 retracts completely through the point of entry the article 10 is then advanced or moved by a mechanism 26 to repeat the process. (Alternatively, the article 10 is manually moved by the individual who is performing the sewing process prior to the process being repeated (e.g., application of the next stitch).

As these steps are repeated a double stitch (e.g., two sets of stitches parallel to each other one running along the need entry points and one running along the needle exit points) is provided in the part or article 10.

In an alternative embodiment, the part 10 is stationary and the needle 20 and hook 22 move with respect to the part 10 by for example a mechanism or robot 28 operably coupled to the needle 20 and hook 22.

Depending on the material construction, the needle 20 can penetrate the decorative layer 12, foam 14 (if required) and substrate layers 16 (if required), or decorative layer 12 and foam 14 (if required) only or in applications where only the decorative outer layer 12 is used the needle can penetrate the outer layer only 12 and depending on the thickness of the outer layer 12 the needle 20 does not necessarily need to pass completely though this layer as long as it enters from the decorative side and exits through the same decorative side at a different location. In the embodiment of only a single layer 12, the knot 44 may be located in the outer layer 12. In the embodiment of a component with only a decorative layer 12 and the foam layer 14, the knot 44 may be located in the foam layer 14. In the embodiment of a component with a decorative layer 12, foam layer 14 and substrate layer 16, the knot 44 may be located in the substrate layer 16 or alternatively in the foam layer 14. Of course and in accordance with various embodiments of the present invention, the knot 44 may be located in or below any of the layers as long as it is below an outer show surface or the first surface of layer 12 that is penetrated by the needle 20.

The portion or product 10 can be sewn either manually or automatically, although as part size increases the use of robotic sewing becomes more plausible due to handling concerns.

Figure 8A:
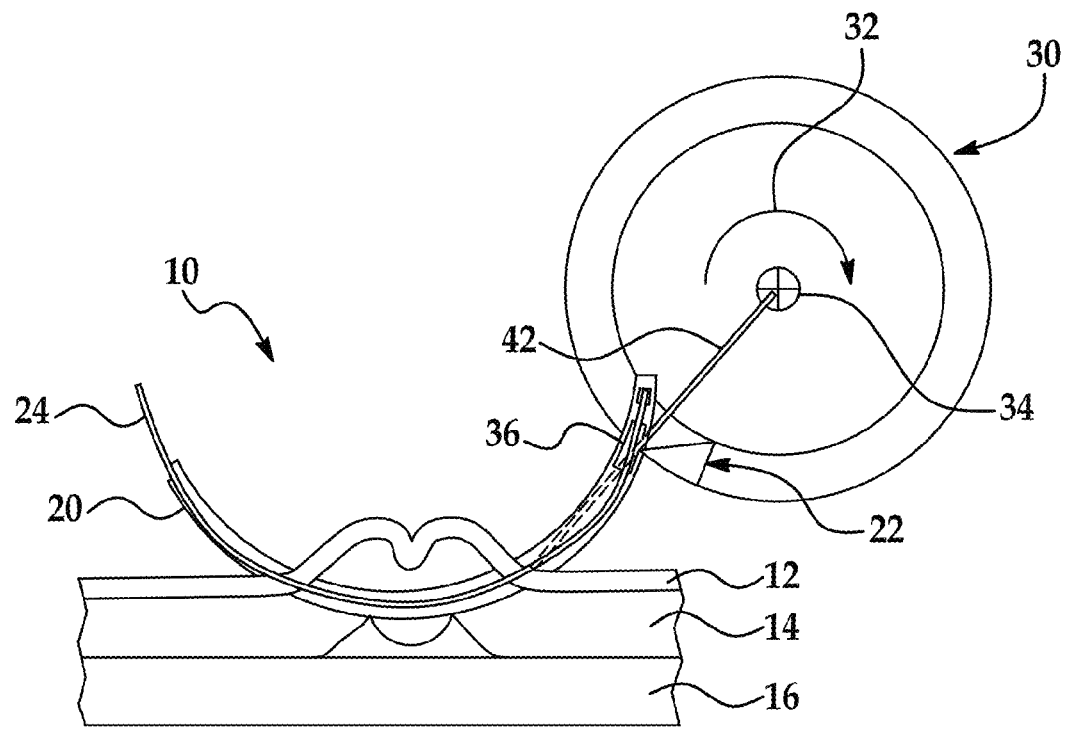
FIGS. 8A and 8B illustrate at least two hook to needle orientations.
Figure 8B:
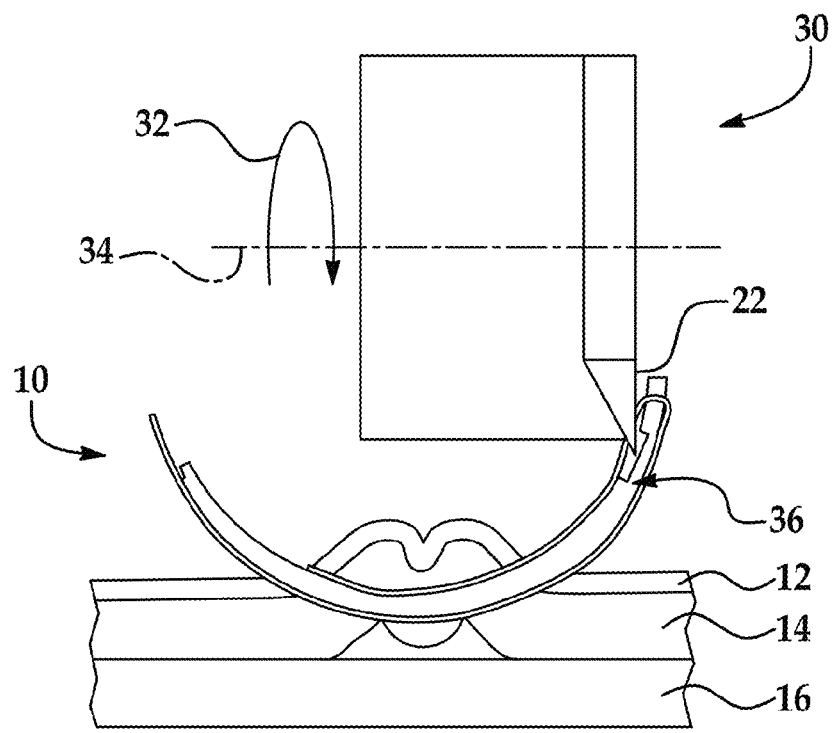

FIGS. 8A and 8B illustrate two possible orientations of the hook 22 with respect to needle 20. In FIG. 8A, a vertical hook 22 is parallel to the needle 20 sewing direction. In FIG. 8B, the vertical hook 22 is perpendicular to the needle 20 sewing direction. Although only two orientations are illustrated it is understood that numerous orientations may be within the scope of various embodiments of the present inventions. As illustrated in FIGS. 8A and 8B, the hook 22 is located on a bobbin assembly or bobbin case 30, which rotates in the direction of arrow 32 about axis 34. As hook 22 rotates the needle thread 24 or loop of needle thread 24 is grasped by the hook 22 proximate to the scarf 36 of the needle 20.

Figure 9:
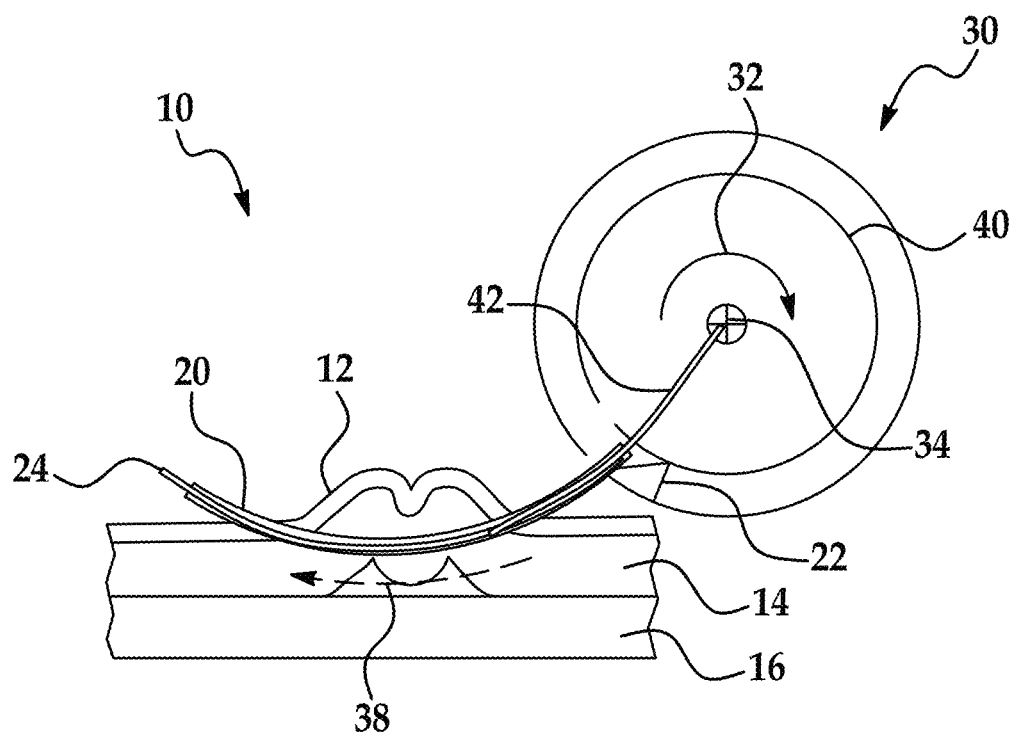
FIGS. 9-19 illustrate a stitch cycle according to one non-limiting embodiment.
Figure 10:
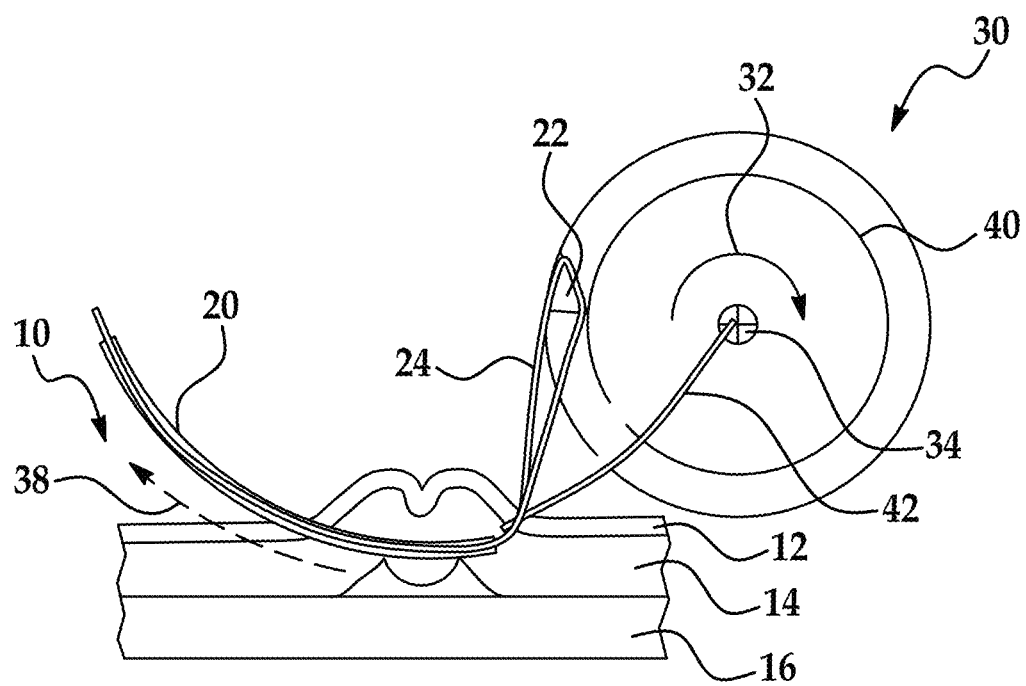

Referring now to FIGS. 9-19 various steps of a stitch cycle or cycles according to one non-limiting embodiment are illustrated. In FIG. 9 the hook 22 engages the needle thread 24 as the needle 20 begins retraction in the direction of arrow 38 from bottom dead center (BDC) of needle 20. Thereafter and as illustrated in FIG. 10, the hook 22 pulls the needle thread 24 around a bobbin 40 of bobbin assembly 30 as needle 20 continues to retract in the direction of arrow 38 and the bobbin 40 and hook 22 of the bobbin assembly 30 rotate in the direction of arrow 32.

Figure 11:
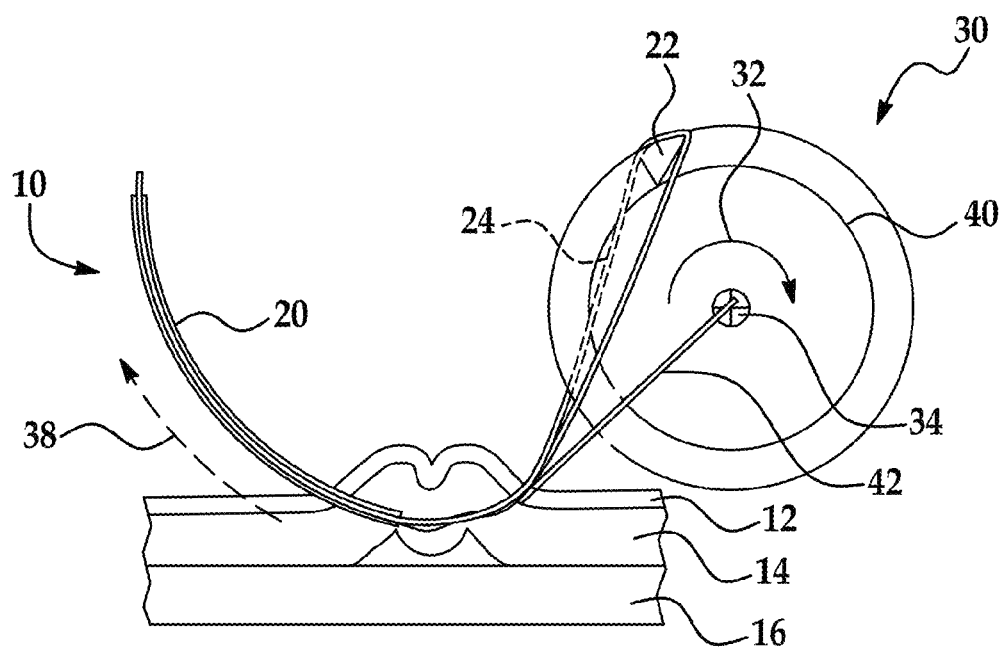
Figure 12:
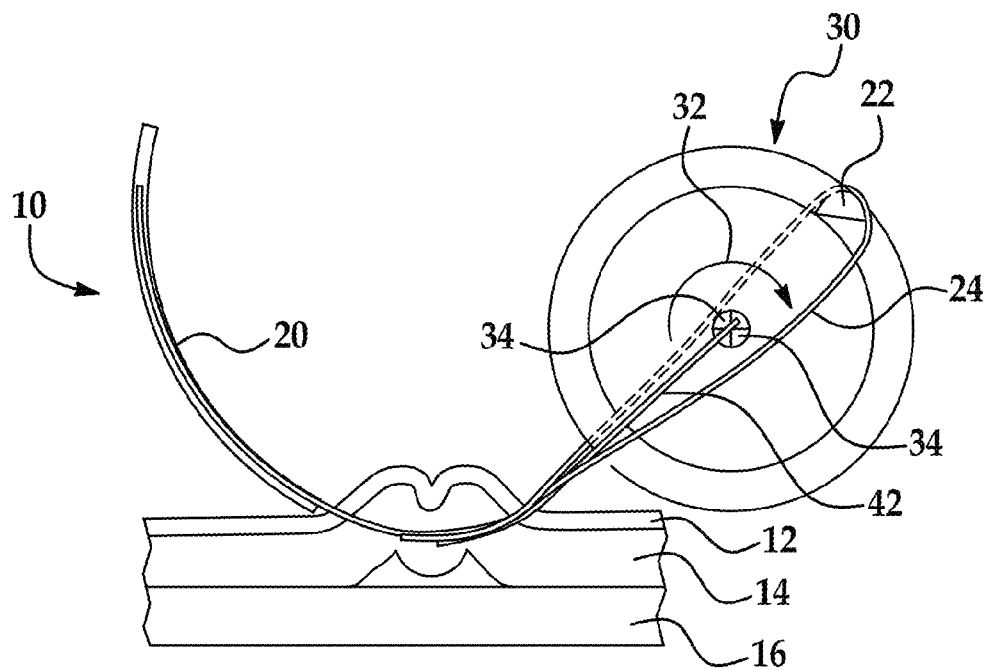

FIG. 11 illustrates the hook 22 pulling the needle thread 24 as the needle 20 continues to retract in the direction of arrow 38. FIG. 12 illustrates the hook 22 beginning to release the needle thread 24 as the bobbin assembly 30 rotates in the direction of arrow 32.

Figure 13:
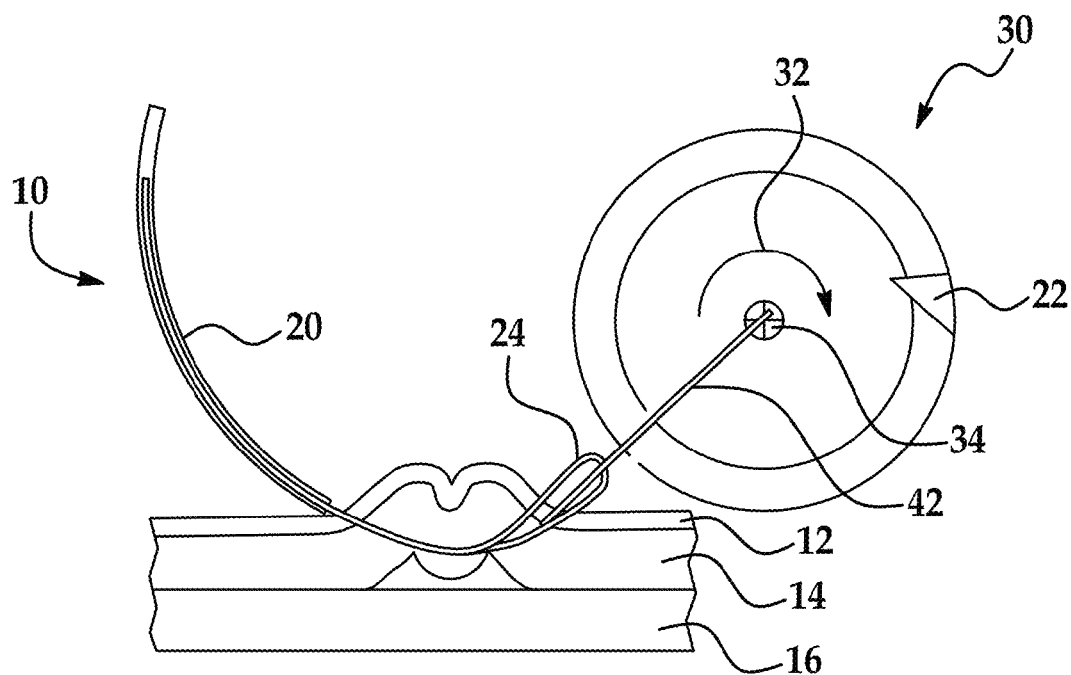
Figure 14:
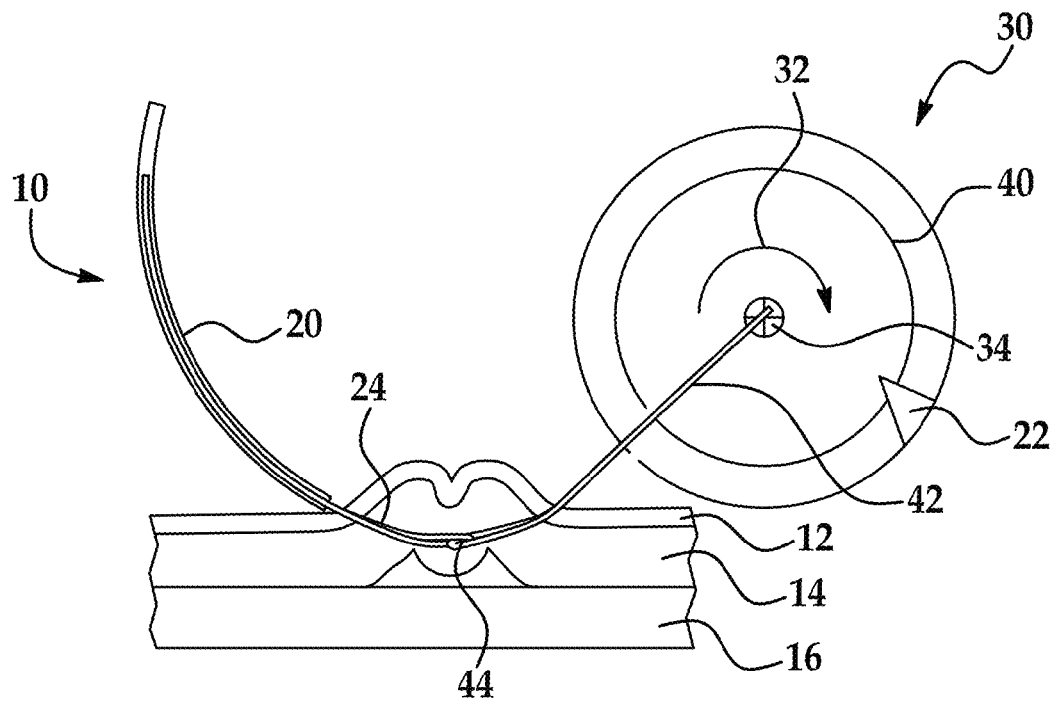

In FIG. 13, the released needle thread 24 pulls a bobbin thread 42 tight against the part 10 forming a new stitch 18 as the part 10 is advanced forward relative to the needle 20. In FIG. 14, the stitch 18 is complete and the part 10 is located at a new position for the start of a new stitch 18. Also shown in FIG. 14 is that a thread knot 44 is located in the foam layer 14 or below outer layer 12. Accordingly, a knot 44 is formed every time the hook 22 carries the needle thread 24 around the bobbin case or bobbin assembly 30. Once the hook 22 releases the needle thread 24, it pulls a length of bobbin thread 42 coming out from the center of the bobbin case or bobbin assembly 30 (from a bobbin winding, which is housed within the bobbin case 30). As the part 10 is then translated relative to the needle 20 and hook 22, the hook 22 picks up the next needle thread 24 and wraps it around the bobbin case and thread 42 once again. The cycle repeats itself, as both needle and bobbin thread 24, 42 are continuous.

Figure 15:
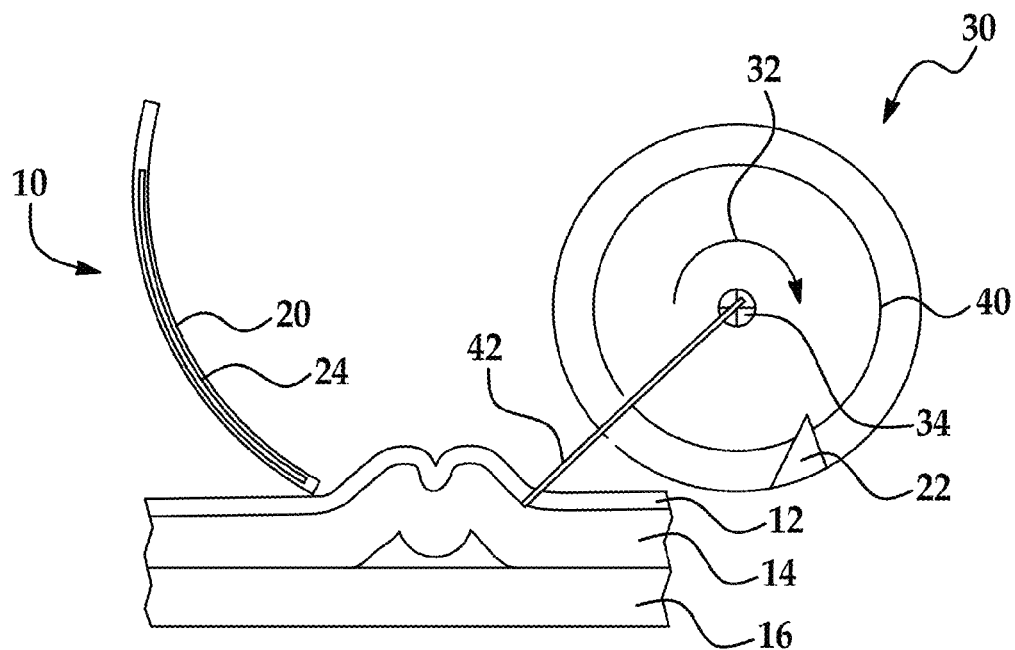
Figure 16:
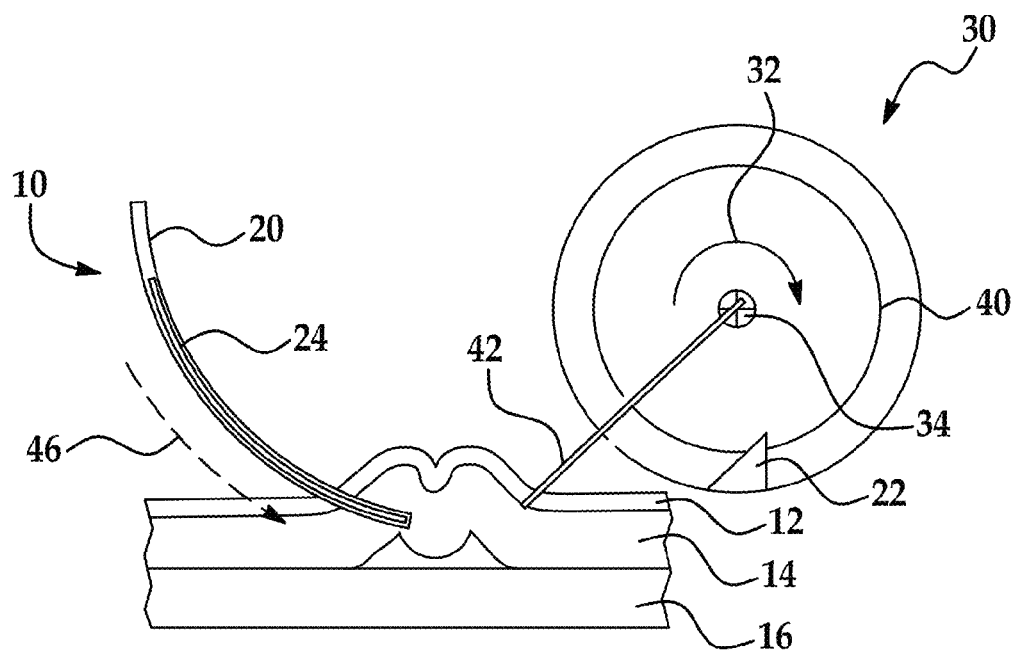
Figure 17:
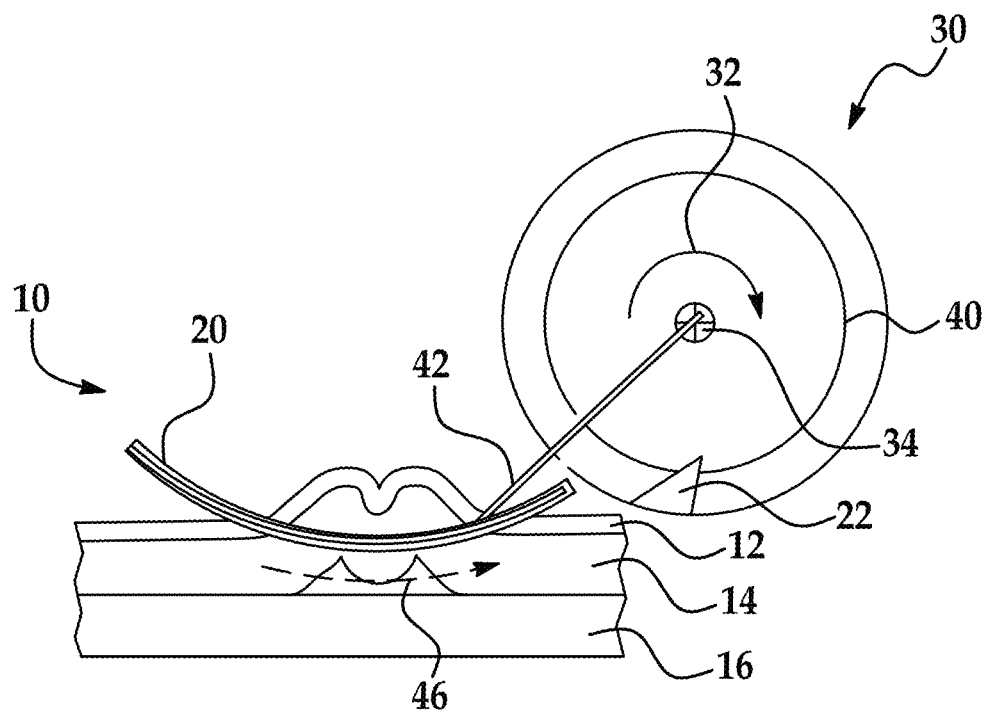
Figure 18:
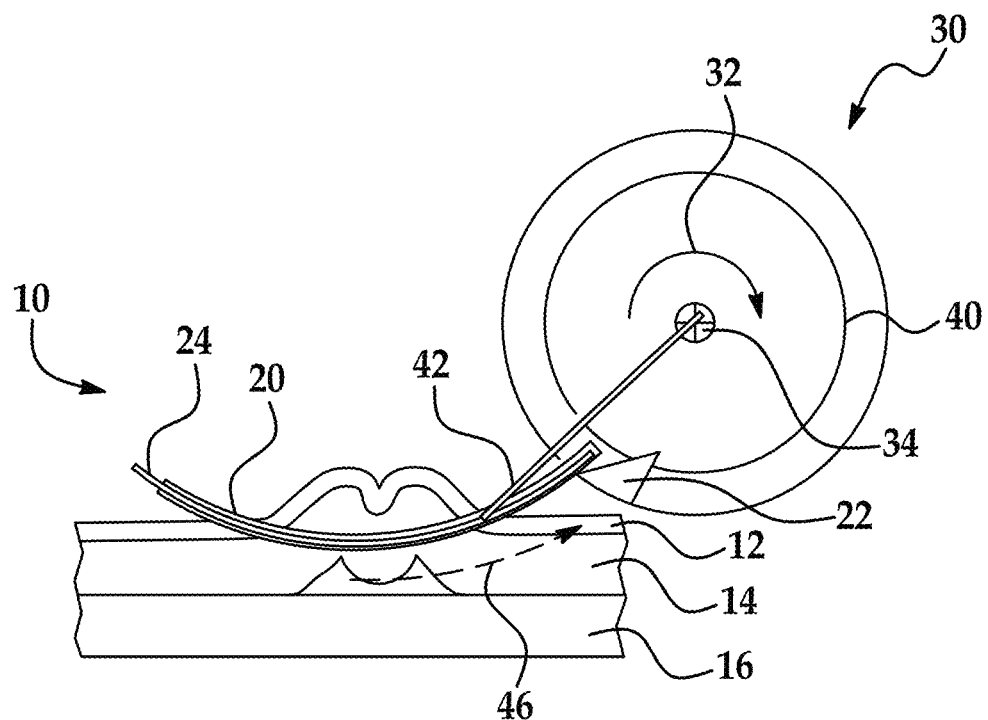
Figure 19:
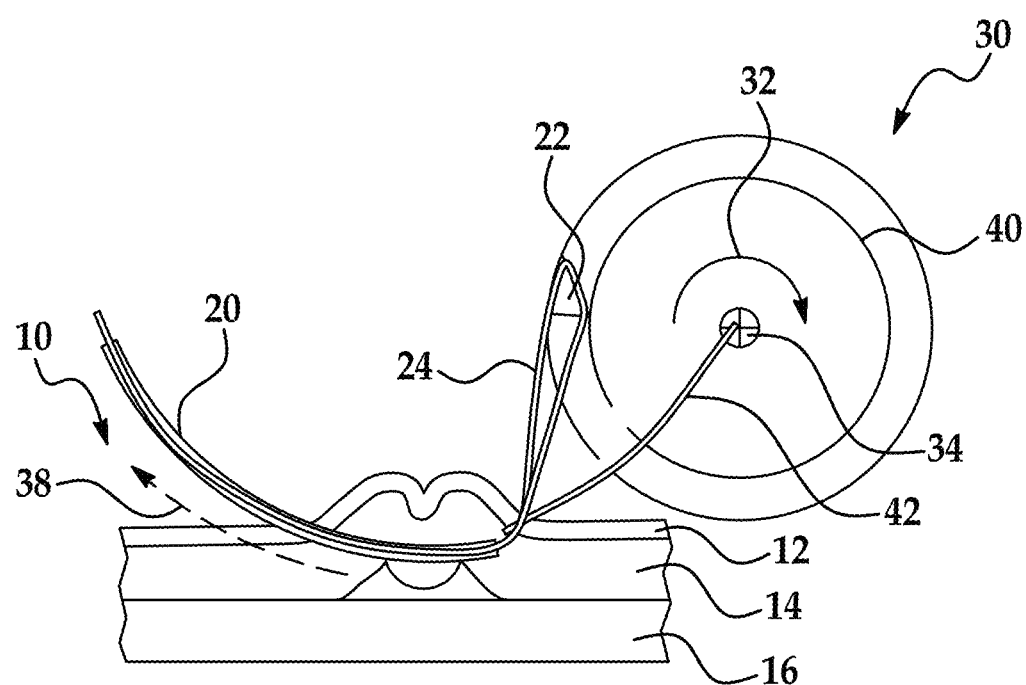

FIG. 15 illustrates the part 10 in a new location as it is ready for the start of the next stitch. In FIG. 16, the next stitch cycle is initiated and the needle 20 begins to move in the direction of arrow 46 and the part 10 is once again penetrated by needle 20. FIG. 17 shows the needle 20 once again exiting the part 10 and in FIG. 18 the hook 22 engages the needle 20 to pick up the needle thread 24. FIG. 19 shows the hook 22 pulling the needle thread 24 around the bobbin 40 as the needle 20 is retracted in the direction of arrow 38 and the stitch cycle continues until the desired amount of stitches 18 are applied to the part 10.

Some notable advantages of this method are that it: permits the stitching of a semi-finished or finished soft clad substrate skin 12 or skin 12 and foam 14 without penetrating the rigid substrate material 16 itself, resulting in no loss of component integrity at the stitch line; permits the sewing of a foamed-in-place product after foaming; allows for the use of a single needle 20 that produces a double thread (French seam) stitch pattern and/or other decorative patterns (See the attached FIGS.); allows for improved part fixturing for automated (robot) sewing as no backside part access is required; allows for the thread knot to be now confined within a much thicker cross section thereby reducing the chance of appearance on the top side of the part (e.g. causing "snake eye" effect for example, see the location of threaded knot 44 in the foam layer as illustrated in at least FIG. 14); allows for access to application areas (previously inaccessible) that can now be sewn with stitches for example, cluster brow tips, sharp radii along the edges of the part, and other extremely narrow channels; and allows for the opportunity to produce alternative decorative styles such as welt beads (See at least FIGS. 1-7 attached hereto) without additional materials or labor.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method of applying stitching to an outer skin layer of an interior component, the method comprising:
    a) penetrating the outer skin layer at an entry point on a first surface of the outer skin layer with a curved needle;
    b) exiting the outer skin layer at an exit point on the first surface with the curved needle, wherein the steps of penetrating and exiting cause a first thread to pass through the entry point and the exit point on the outer skin layer;
    c) grabbing the first thread with a hook located proximate to the exit point;
    d) retracting the needle through the exit point and the entry point while pulling a second thread through the exit point via the first thread to form a stitch; e) advancing the outer skin layer to a new location with respect to the needle and hook; and
    f) repeating steps a-e until a predetermined amount of stitches are applied to the outer skin layer.

2. The method as in claim 1, wherein outer skin layer, is formed from the group consisting of vinyl, leather and thermoplastic polyolefin.

3. An interior component formed by the method of claim 2, wherein the interior component is an interior trim piece of a vehicle.

4. The interior component of claim 3, wherein the interior trim piece is a portion of an instrument panel of the vehicle.

5. An interior component formed by the method of claim 1, wherein the interior component is an interior trim piece of a vehicle.

6. The interior component of claim 5, wherein the interior trim piece is a portion of an instrument panel of the vehicle.

7. The method as in claim 1, wherein outer skin layer, is formed from the group consisting of vinyl, leather and thermoplastic polyolefin; and wherein an intermediary layer is applied to a second surface of the outer skin layer, the second surface being opposite the first surface.

8. The method as in claim 7, wherein the intermediary layer is a foam layer.

9. The method as in claim 8, wherein a substrate layer is applied to the foam layer and wherein the substrate layer is formed from plastic.

10. The interior of claim 9, wherein the interior component is an interior trim piece of a vehicle.

11. An interior component formed by the method of claim 1.

12. The interior component of claim 11, wherein the interior component is an interior trim piece of a vehicle.

13. The interior component of claim 12, wherein the interior trim piece is a portion of an instrument panel of the vehicle.

14. The interior component of claim 12, wherein outer skin layer is formed from the group consisting of vinyl, leather and thermoplastic polyolefin; and wherein an intermediary layer is applied to a second surface of the outer skin layer, the second surface being opposite the first surface.

15. The interior component of claim 14, wherein the intermediary layer is a foam layer and wherein a substrate layer is applied to the foam layer and wherein the substrate layer is formed from plastic.

16. A method of applying stitching to an interior component, comprising an outer skin layer, a substrate layer and an intermediary layer located between the outer skin layer and the substrate layer, the method comprising:
    a) penetrating the outer skin layer at an entry point on a first surface of the outer skin layer with a curved needle;
    b) exiting the outer skin layer at an exit point on the first surface with the curved needle, wherein the steps of penetrating and exiting cause a thread to pass through the entry point and the exit point on the outer skin layer;
    c) grabbing the first thread with a hook located proximate to the exit point;
    d) retracting the needle through the exit point and the entry point while pulling a second thread through the exit point via the first thread to form a stitch;
    e) advancing the outer skin layer to a new location with respect to the needle and hook; and
    f) repeating steps a-e until a predetermined amount of stitches are applied to the outer skin layer.

17. The method as in claim 16, wherein outer skin layer, is formed from the group consisting of vinyl, leather and thermoplastic polyolefin; and the intermediary layer is a foam layer and the substrate layer is formed from plastic and wherein during the penetrating step the needle also passes through the intermediary layer.

18. An interior component formed by the method of claim 17, wherein the interior component is an interior trim piece of a vehicle.

19. The interior component of claim 18, wherein the interior trim piece is a portion of an instrument panel of the vehicle.

20. A method of applying stitching to an interior component, comprising an outer skin layer and a foam layer applied thereto, the method comprising:
    a) penetrating the outer skin layer at an entry point on a first surface of the outer skin layer with a curved needle;
    b) exiting the outer skin layer at an exit point on the first surface with the curved needle, wherein the steps of penetrating and exiting cause a thread to pass through the entry point and the exit point on the outer skin layer and wherein the foam layer is applied to a second surface of the outer skin layer, the second surface being opposite the first surface and wherein the needle also passes through a portion of the foam layer as it travels through the entry point and the exit point;
    c) grabbing the first thread with a hook located proximate to the exit point;
    d) retracting the needle through the exit point and the entry point while pulling a second thread through the exit point via the first thread to form a stitch;
    e) advancing the outer skin layer to a new location with respect to the needle and hook; and
    f) repeating steps a-e until a predetermined amount of stitches are applied to the outer skin layer.

21. The method as in claim 7, wherein the intermediary layer is a spacer fabric.

22. The method as in claim 20, wherein outer skin layer, is formed from the group consisting of vinyl, leather and thermoplastic polyolefin.

23. The method as in claim 1, wherein outer skin layer, is formed from the group consisting of vinyl, leather and thermoplastic polyolefin; and wherein an intermediary layer is applied to a second surface of the outer skin layer, the second surface being opposite the first surface and wherein the intermediary layer is a foam layer and a substrate layer is applied to the foam layer, wherein the substrate layer is formed from plastic and wherein the curved need passes through the outer layer, the foam layer and the substrate layer when the stitch is formed.

24. An interior component formed by the method of claim 20, wherein the interior component is an interior trim piece of a vehicle.

25. The interior component of claim 24, wherein the interior trim piece is a portion of an instrument panel of the vehicle.

26. The method as in claim 20, wherein outer skin layer, is formed from the group consisting of vinyl, leather and thermoplastic polyolefin; and wherein an intermediary layer is applied to a second surface of the outer skin layer, the second surface being opposite the first surface.

* * * * *